Sept. 9, 1969    J. R. HARMON ET AL    3,465,987
AUTOMATIC AERIAL DISTRESS SIGNAL
Filed Oct. 19, 1967    3 Sheets-Sheet 1
FIG. 1
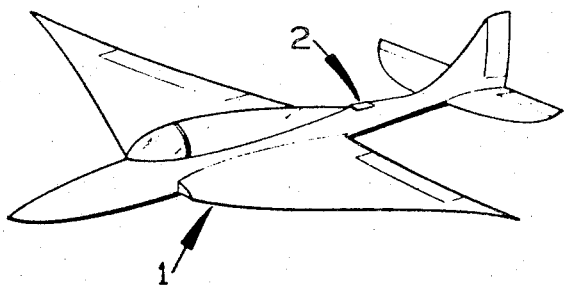
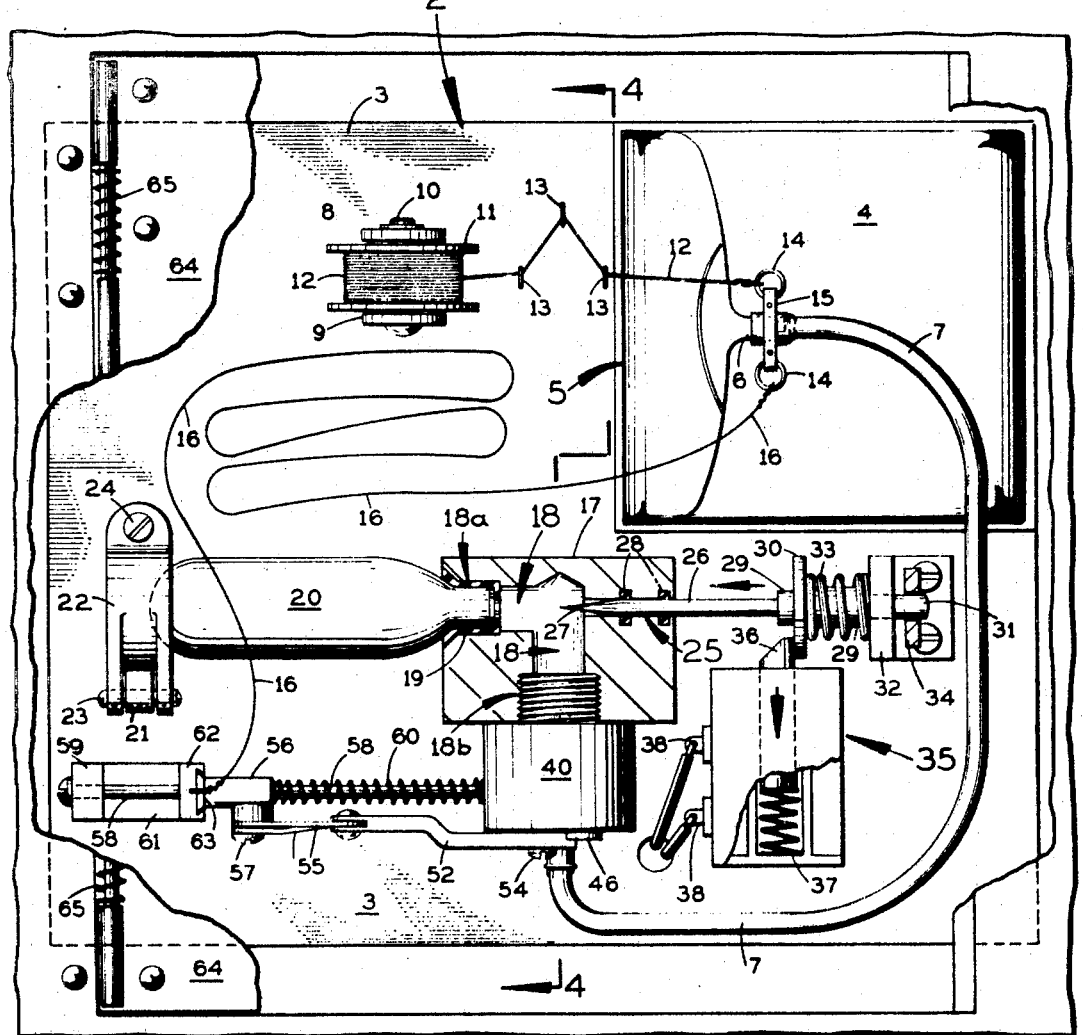
FIG. 2
INVENTORS
JAMES R. HARMON
HODGIE L. YARBROUGH
BY
*Lloyd J. Andersen*

Sept. 9, 1969     J. R. HARMON ET AL     3,465,987
AUTOMATIC AERIAL DISTRESS SIGNAL
Filed Oct. 19, 1967     3 Sheets-Sheet 2

INVENTORS
JAMES R. HARMON
HODGIE L. YARBROUGH
BY

Sept. 9, 1969  J. R. HARMON ET AL  3,465,987
AUTOMATIC AERIAL DISTRESS SIGNAL
Filed Oct. 19, 1967  3 Sheets-Sheet 3
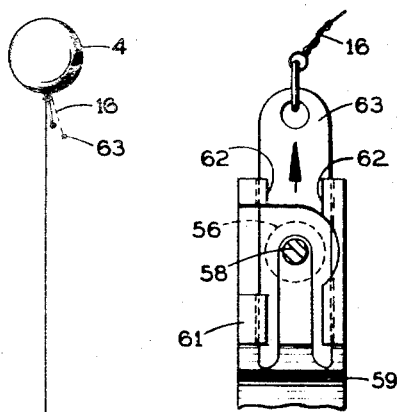
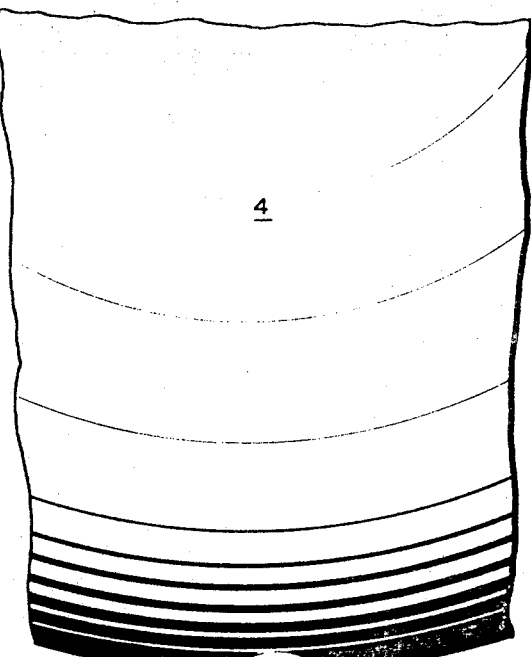
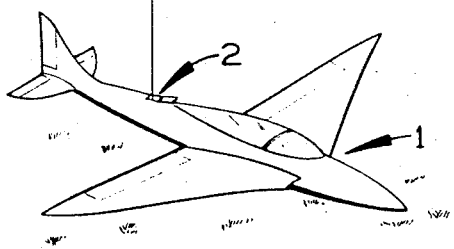
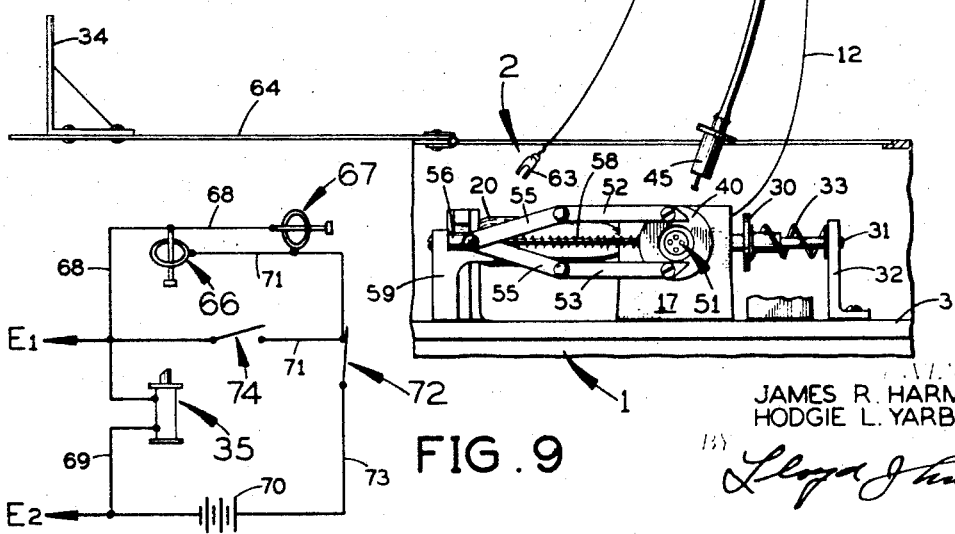
INVENTORS
JAMES R. HARMON
HODGIE L. YARBROUGH

United States Patent Office 3,465,987
Patented Sept. 9, 1969

3,465,987
AUTOMATIC AERIAL DISTRESS SIGNAL
James R. Harmon, 6801 SW. 17th St., and Hodgie L. Yarbrough, 6744 SW. 21st St., both of Miami, Fla. 33155
Filed Oct. 19, 1967, Ser. No. 676,453
Int. Cl. B64d 25/00
U.S. Cl. 244—1                    8 Claims

ABSTRACT OF THE DISCLOSURE

An apparatus for automatically inflating and releasing a captive balloon with lighter than air gas and sealing said balloon to permit same to rise a predetermined distance above the earth and retained by a line when momentarily triggered manually or by predetermined shock.

---

This invention relates in general to aerial signal devices and more particularly to a compact mechanism for retaining a deflated signal balloon and an automatic means for inflation thereof with lighter than air gas and reel means for paying out a predetermined length of captive line including means for automatically releasing and triggering the operation of the device by shock or manual means.

Prior aerial signal devices were dependent entirely upon manual inflation and release, which under certain distress conditions prohibits their use, particularly when related to aircraft or air or water craft and in many cases the captive line prevents the ascent of the balloon because of entanglement.

The present invention overcomes the above objections and disadvantages by the provision of a shock or manually operated mechanism for releasing a cylinder of highly compressed lighter than air gas into a balloon stored within the container and held thereto until inflated by automatically disconnecting the inflation means and sealing and permitting the balloon to rise under the control and pay out of a line retained on a reel, which construction is a principal object of the invention.

Another object of the invention is the provision of a pre-loaded means for piercing a conventional compressed gas cylinder for releasing the contents into a filler tube connecting the balloon, which tube contains a valve means for automatically sealing same upon the ascent of the balloon.

A further object of the invention provides an electromagnetic means for triggering a pre-loaded gas release means when momentarily energized for inflating a balloon.

A further object of the invention is the provision of a reel for retaining a predetermined length of line wound thereon and a frictional means for the latter to prevent over-run and entanglement of the line by over-run of the reel while the balloon is ascending to its predetermined captive height.

Another object of the invention is the provision of an inflation tube including a valve and release means therefor responsive to the upward movement of the balloon when inflated to automatically release and seal the inflation tube of the balloon.

These and other objects and advantages in one embodiment of the invention are described and shown in the following specification and drawings, in which:

FIG. 1 illustrates a typical aircraft with the emergency signal apparatus secured within the upper part of the fuselage thereof.

FIG. 2 is a top plan view of the apparatus shown in FIG. 1 with portions thereof broken away and elements in cross section.

FIG. 6 is a fragmentary view taken through section line 6—6, FIG. 3, showing the inflation conduit release means.

FIG. 7 is a fragmentary side elevation of the device following the balloon inflation and the start of the ascension thereof.

FIG. 8 illustrates the final position of the signal balloon captive to a grounded aircraft.

FIG. 9 is a schematic circuit diagram of the electric components of the device.

Figures 3, 4, 5:
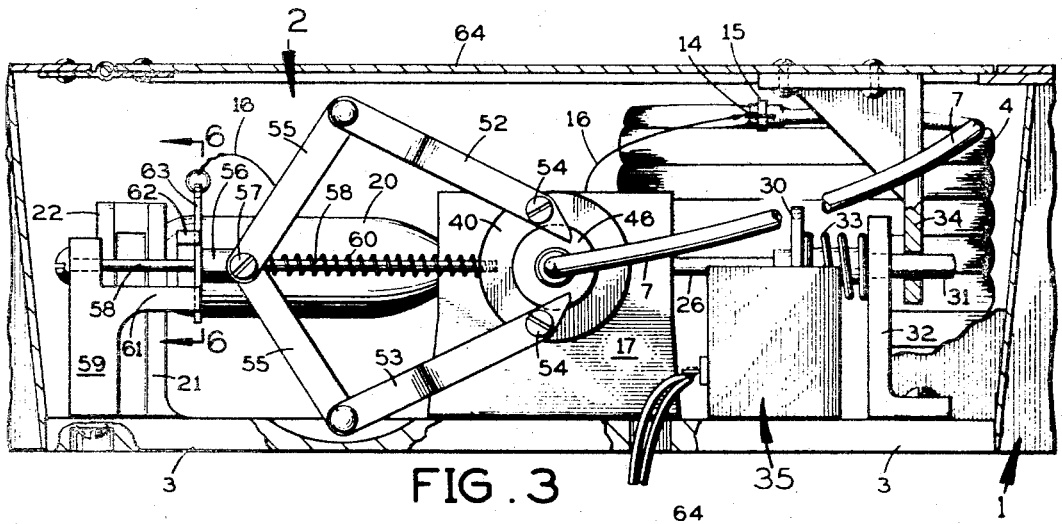
FIG. 3 is a left side elevation of the apparatus shown in FIG. 2 installed within the fuselage of an aircraft.
FIG. 4 is a cross sectional view taken through section line 4—4, FIG. 2, as installed in the aircraft shown in FIG. 3.
FIG. 5 is a rear elevation of the apparatus shown in FIG. 2, as illustrated in the aircraft.

FIG. 1 illustrates a typical aircraft 1, in which the aerial signal device 2 is installed in the upper rear portion of the fuselage. It is apparent that a second precautionary installation in the underside of the fuselage would provide for a secondary signal in the case of an inversion crash. It is also apparent that the device may be installed in other vehicles, such as boats and ground travel vehicles.

FIG. 2 illustrates a typical embodiment of the device showing a base 3 thereof with the cover broken away and a deflated balloon 4, preferably made from metallic coated plastic material, folded into rectangular form and compactly retained within a compartment 5 positioned on one corner of the base 3. The balloon may be folded in the manner similar to a parachute pack to conserve space and assure the proper inflation of same.

The balloon is provided with a combination anchor and filler member 6 attached thereto by well-known means and a flexible filler tube 7, such as vinyl plastic tubing, has one end connected to the filler member 6, as shown.

Referring to FIGS. 2 and 4, a pair of uprights 8 and 9, integral with the base 3, support on a horizontal axle 10 a reel 11 on which is wound a predetermined length of line 12, such as the nylon monofilament type, with the inner end thereof secured to the reel. Three eyes 13 are secured to base 3 in a triangular formation, through which the line is threaded for providing a predetermined friction during the pay-out of the line, as shown, to prevent entanglement. The outer end of the line is secured to a ring 14, which in turn is retained to the balloon filler member 6 by an anchor clamp 15 retained in a groove in the filler member. A second ring 14, also secured to the anchor clamp, has fastened thereto a valve release tether line 16, to be hereinafter described.

A body member 17 on base 3 has a right angled channel bore 18 therein terminating at one side in a counter bore socket 18a for receiving a resilient sealing member 19 which is provided for the sealed insertion of the nozzle of a compressed gas cartridge 20 containing highly compressed lighter than air gas, such as hydrogen or helium, with said nozzle sealed closed with a well-known coaxial piercable metal cap. The cartridge 20 is clamped into alignment with the socket 18a by a support 21 integral with base 3 on which a clamping member 22 is hinged on a pivot 23 and retained by screw 24 on the support 21. Mating hemispherical cavities are provided in one side of the support and the clamping member 22 to mate with the spherical end of the cartridge 20 and hold the latter in the sealed position, better shown in FIG. 5.

The body 17 has a small bore 25 coaxial with the counter bore socket 18a for slidably retaining a piercing rod 26 having a piercing point 27 on the end thereof. The rod is slidably and hermetically sealed in the bore 25 by a pair of resilient O-rings 28. The opposite end of rod 26 is coaxially secured in a cylindrical member 29 having an integral flange 30. The outer end 31 of member 29 is journalled for reciprocation in a coaxial bore in support member 32 secured to the base 3 by screw means. A coil compression spring 33 is positioned between flange 30 and the support member 32 for normally and forcibly urging the rod 26 in the direction shown by arrow.

A cover release member 34, shown in cross section, is normally engaged by the outer end 31 of member 29. An electromagnetic solenoid 35 is secured to base 3 and is provided with a core 36 normally urged into engagement with the outer side of flange 30, as shown, by spring 37 with the spring 33 in compressed position. The coil of the solenoid is connected to terminals 38—38. It is now apparent that when the solenoid 35 is deenergized the member 29 may be manually moved to a cocked position with the flange 30 in latched engagement with core 36, as shown, against the restraining action of compression spring 33.

It is also apparent that when the solenoid is energized, the core 36 will move in the direction shown by arrow against the restraining action of spring 37, and release flange 30 permitting the point 27 of the rod 26 to pierce the cap in the end of cartridge 20 by virtue of the energy in spring 33 and permit the gas therein to escape into the right angled bore 18, and simultaneously disengage the end 31 of the member from the cover release member 34.

Referring to FIGS. 2, 3, and 4, an outlet socket bushing 40 is threaded into a counter bore 18b, shown in FIG. 2, which bushing has a coaxial socket bore 41 in opposite ends of the bushing with a transverse integral partition 42 therein into which a valve actuating pin 43 is centrally secured and facing the outer side of the bushing. The partition also has a plurality of holes 44 adjacent the pin 43 for the passage of gas.

A plug means 45 having an integral flange 46 has a coaxial bore therethrough with the inner portion thereof threaded to receive a conventional type normally closed tire valve assembly 47. A coaxial tubular extension 48 extending outward from the flange 46 provides coupling means for the opposite end of tube 7. A resilient O-ring 49 is placed between the outer surface of partition 42 and the inner end of plug 45 and compressed by the outer end of the plug when the flange 46 is positioned in its locked position, as shown in FIG. 4 with the valve stem depressed into its open position by pin 43. An ejection compression coil spring 50 is retained in a counter bore 51 in the outer side of socket bushing 40 coaxial with bore 41 and in compressed contact with the inner side of flange 46, as shown. The valve assembly 47 is normally held in its open position by the pin 43, as shown in FIG. 4, by means of a lever system, shown in FIG. 3, in which levers 42 and 53 are pivotally secured to socket bushing 40 by screws 54—54 with the outer ends thereof normally overlapping the outer surface of flange 46 and normally holding the plug assembly in the idle position shown in FIG. 4.

One end of each of a pair of links 55—55 are pivotally connected to the outer end of each of the levers 52 and 53, respectively, by conventional rivets. The remaining ends of the links 55 are pivotally connected to a release block 56 by a screw 57. The block 56 is slidably retained on rod 58 with one end supported by an upright member 59 secured to base 3 and the opposite end threaded into bushing 40, as shown. A coil compression spring 60 is positioned on rod 58 between block 56 and bushing 40, better shown in FIG. 2.

Referring to FIGS. 1, 2, and 6, member 59 has an integral offset bracket 61 terminating in an upright portion 62 which has a dovetail groove formed in one side thereof in vertical relation to the rod 58 with the rod 58 positioned in a hole central of the said groove, as illustrated in FIG. 6. A release member 63 having an inverted U-shaped lower end is loosely retained in the dovetailed groove in the upright portion 62.

Referring to FIGS. 2 and 6, the upper end of the trigger 63 is connected in a well-known manner to the opposite end of release line 16, by a ring, as shown.

FIG. 9 illustrates the electric components of the device, in which a pair of normally open shock responsive switches 66 and 67 are adapted to respond and momentarily close when subject to either a vertical or a horizontal shock of predetermined magnitude, respectively.

It is to be noted that single switches are available that are responsible to predetermined shock in any direction, one of which may be used as an alternate to switches 66 and 67.

Either switch 66 or 67 will momentarily energize the solenoid 35 from the battery 70 when subject to shock, through conductors 68, 69, 71 and 73, through a normally closed single circuit switch 72. The extension conductors $E_1$ and $E_2$, connected to conductors 68 and 69, respectively, may be used if desired to energize well-known electric responsive fire extinguishers, fuel cut-off valves or engine de-activating devices. The switch 72 is provided for manually rendering the device inoperative when a rough landing is expected within surveillance areas, such as airports.

In operation and under the assumption that the device is secured on a craft in a manner illustrated in FIG. 3, and the craft is in distress in an isolated area a distance from normal help, then the manual operation of switch 74, or the shock operation of either switch 66 or 67 will automatically close and energize solenoid 35 and attract the core 36 from holding engagement with the flange 30 and release spring 29, which will drive rod 26 in the direction shown by arrow in FIG. 2. This will result in the piercing point 27 perforating the sealed cap of cartridge 20, thus releasing the compressed lighter than air gas therein into bore 18 and through the plug 46 and the open valve therein and conduit 7 for inflating the balloon. Simultaneously, the end 31 of member 29 will withdraw from its engagement with cover release member 34 and permit the springs 65 of the cover hinge to swing the cover clear of the device. The compacted balloon 4 will then inflat and rise and when the line 16 is pulled taut within a cone angle of approximately thirty degrees, it will withdraw the release member 63 from engagement with block 56, which will result in the spring 60 moving the block rearward and collapsing the levers 52 and 53 from the position shown in FIG. 3 to the position shown in FIG. 7, thus releasing the flange 46 and permitting the spring 51, better shown in FIG. 4, to eject the plug 45 from the socket bushing 40.

It is apparent that one of several release members, such as triggers and the like, may be substituted for the member 66, shown, with equal results.

Simultaneous with the ejection of plug 45, the valve assembly 47 in the plug will automatically close and retain the gas in the balloon and permit the latter to rise and withdraw the anchor line 12 from the reel 11 to a height determined by the length of line.

It is now apparent that the balloon will be visible to the eye over a considerable distance and the metallic coating on the balloon will give a desired response to radar scanning for accurately locating the craft.

It is to be understood that certain modifications in the above construction, utilizing the features described, are intended to come within the scope of the appended claims.

Having described our invention, we claim:

1. An aerial distress signal device comprising a means forming a base,
   a balloon including a filler member thereon compacted in one portion of said base,
   a flexible inflation tube having one end thereof hermetically secured to said filler member and the opposite end thereof terminating in a plug means having a bore therethrough coaxial with said tube for inflating said balloon when connected to a source of pressurized gas including a normally closed valve means in said bore having an outward extending projection for holding said valve in open position when depressed, a reel means journalled for predetermined frictional rotation on said base including a predetermined length of line wound thereon with the inner end thereof anchored to said reel means and the outer end of said line anchored to said filler member, a friction means on said housing positioned between said reel means and said filler member with said line threaded therethrough for applying predetermined friction to said line when withdrawn by said filler member of said balloon for preventing over-run of said reel means, a body member on said base having a bore therethrough terminating at each opposite end in an inlet and an outlet socket respectively, a container retaining compressed lighter than air gas including a nozzle having a pierceable sealed cap in the outlet end thereof, a clamping means on said base for holding said container with the said nozzle thereof in said inlet socket including a resilient hermetic seal around said nozzle and within said inlet socket, a piercing member having a pointed end positioned and sealed for reciprocation through said body member with said pointed end thereof in said bore movable from a latched idle position to a position pierced through said cap of said container when operated, a spring means biased between said body member and said piercing member for normally urging the latter into the said position pierced through said cap, an electro-magnetic latching means on said base operatively associated with said piercing member for normally holding same in said idle position and releasing same from said idle position to said position pierced through said cap when energized, said plug means locked into said outlet socket including abutment means therein for depressing said projection for holding said valve means in open position and including sealing means for hermetically sealing said plug means into said outlet socket, spring means biased between said body and said plug means for ejecting the latter when unlocked, locking means on said base for movement from a lock position holding said plug means in said outlet socket and adapted and constructed for movement to unlock said plug means for ejection when operated, a balloon release member adapted and constructed to operate said locking means when subjected to an upward component of force including a release line of predetermined length having opposite ends thereof secured to said release member and said filler member respectively whereby said piercing member will release and pierce said cap and permit the gas in said container to flow therefrom through said body member and said plug means and said tube into said balloon and inflate same and whereby the upward movement of said balloon will raise said second line and said release member to permit said plug means to be ejected from said body means for the continued ascention of said balloon to a height limited to the extent of said first line.

2. The construction recited in claim 1 including a source of electric energy, a single circuit normally open shock operated switch means responsive to a predetermined minimum shock force, a circuit means connecting said source of power and said switch means and said electro-magnetic latching means whereby a shock of said predetermined or greater force will momentarily close said switch means and energize said latching means for piercing said cap and releasing said gas from said container and inflating said balloon.

3. The construction recited in claim 1 including a source of electric energy, a single circuit normally open manually operated switch means, circuit means connecting said source of energy and said first switch means and said electro-magnetic latching means whereby the closing of said first switch means will energize said latching means and pierce said gas cap and release said gas from said container and inflate said balloon.

4. The construction recited in claim 1 including a source of electric energy, a single circuit normally open shock operated switch means responsive to a predetermined minimum shock force, a single circuit normally closed manually operated switch means, a circuit means connecting said source of power and said shock operated switch means and said normally closed switch means and said electro-magnetic latching means whereby the manual opening of said normally closed switch means will prevent said shock operated switch means from energizing said magnetic latching means.

5. In a signal device of the character described a means forming a base, a balloon including a filler tube connected thereto compacted on said base, a plug having a bore therethrough secured to the end of said tube for inflating said balloon when connected to a source of pressurized gas, a normally closed valve means in said bore of said plug having an outward extending projection for holding said valve in open position when depressed, a body member on said base having a bore therethrough terminating at each opposite end in an inlet and an outlet socket respectively, said plug normally locked and hermetically sealed into said outlet socket, abutment means fixed in said socket for depressing said projection of said valve means into open position when said plug is sealed in said socket, a container retaining compressed lighter than air gas having a pierceable sealed cap at the outlet end thereof, holding means on said base for removably retaining said container with the cap end thereof hermetically sealed into said inlet of said body member, a cap piercing member positioned and sealed for reciprocation through said body member with the inner end thereof in said bore movable from a latched idle position to a position pierced through said cap when operated, a spring means biased between said body member and said piercing member for normally urging the latter into the said position pierced through said cap, an electro-magnetic latching means on said base operatively associated with said piercing member for normally holding same against the action of said spring means into said idle position and for releasing said piercing member therefrom to pierce said cap when energized for inflating said balloon.

6. The construction recited in claim 5 including a cover member for normally enclosing said base, said cover member hinged about an axis along one edge thereof including spring means biased between said base and said cover member for normally urging the latter into an open position with respect to said base, a latch secured to said cover member and constructed and adapted to engage said cap piercing member when in said idle position whereby said cover member will move to said open position when said piercing member is moved to the said position pierced through said cap.

7. In a signal device of the character described a means forming a base,
   a balloon including a filler tube connected thereto compacted on said base,
   a plug having a bore therethrough secured to the end of said tube for inflating said balloon when locked to a source of pressurized gas,
   a normally closed valve means in said bore of said plug having an outward extending projection for holding said valve in open position when depressed,
   a source of compressed lighter than air gas,
   a gas release body member on said base having an outlet socket for hermetically sealing said plug therein and conducting said gas therein when operated,
   said source of gas connected to said body member for supplying pressurized gas into said plug when said body member is operated,
   an abutment means fixed in said socket for depressing said projection of said valve means into open position when said plug is locked in said socket,
   a locking means operatively associated with said body for movement from a locked to an unlocked position for holding said plug in said outlet when in said locked position,
   spring means biased between said body and said locking means for normally urging the latter into said unlocked position,
   a release member normally holding said locking means in said locked position,
   a release line of predetermined length with opposite ends thereof connecting said balloon and said release means respectively whereby the operation of said body member will inflate said balloon and the ascension thereof a predetermined distance will withdraw said release line and operate said release means to unlock said plug and release the latter from said outlet socket and permit said valve means to close and said tube and plug to ascend with said balloon.

8. The construction recited in claim 7 including a spring means biased between said body member and said plug for ejecting the latter from said outlet when said plug is unlocked.

References Cited

UNITED STATES PATENTS

| | | | |
|---|---|---|---|
| 1,836,495 | 12/1931 | Paulson | 244—1 |
| 2,470,783 | 5/1949 | Mead | 244—1 X |
| 2,778,332 | 1/1957 | Talbot | 244—1 X |
| 2,825,803 | 3/1958 | Newbrough | 9—9 X |

FERGUS S. MIDDLETON, Primary Examiner

U.S. Cl. X.R.

9—9